United States Patent [19]

Herfurth et al.

[11] Patent Number: 5,049,790
[45] Date of Patent: Sep. 17, 1991

[54] METHOD AND APPARATUS FOR OPERATING AT LEAST ONE GAS DISCHARGE LAMP

[75] Inventors: Michael Herfurth, Gilching; Ali-Ihsan Soeylemez, Munich, both of Fed. Rep. of Germany

[73] Assignee: Siemens Aktiengesellschaft, Munich, Fed. Rep. of Germany

[21] Appl. No.: 410,920

[22] Filed: Sep. 22, 1989

[30] Foreign Application Priority Data

Sep. 23, 1988 [EP] European Pat. Off. ......... 88115709

[51] Int. Cl.⁵ .................. H05B 41/00; H05B 37/00
[52] U.S. Cl. .................... 315/291; 315/307; 315/308; 315/224; 315/DIG. 4
[58] Field of Search ......... 315/291, 307, 224, DIG. 4, 315/308

[56] References Cited

U.S. PATENT DOCUMENTS

| | | | |
|---|---|---|---|
| 3,999,100 | 12/1976 | Dendy et al. | 315/308 |
| 4,338,565 | 6/1982 | Rividi | 315/291 |
| 4,346,332 | 8/1982 | Walden | 315/307 |
| 4,392,086 | 7/1983 | Ide et al. | 315/291 |
| 4,663,566 | 5/1987 | Nagano | 315/97 |
| 4,704,563 | 11/1987 | Hussey | 315/307 |
| 4,717,863 | 1/1988 | Zeiler | 315/DIG. 4 |
| 4,791,338 | 12/1988 | Dean et al. | 315/308 |
| 4,870,566 | 9/1989 | Jorgensen | 315/307 |
| 4,958,108 | 9/1990 | Jorgensen | 315/308 |

FOREIGN PATENT DOCUMENTS

| | | |
|---|---|---|
| 0059064 | 9/1982 | European Pat. Off. . |
| 0127101 | 12/1984 | European Pat. Off. . |
| 0178852 | 4/1986 | European Pat. Off. . |
| 3301108 | 7/1984 | Fed. Rep. of Germany . |
| 3432266 | 3/1985 | Fed. Rep. of Germany . |
| 3511661 | 10/1986 | Fed. Rep. of Germany . |

OTHER PUBLICATIONS

Siemens Components 22 (1984), Book 6, pp. 249–254, DE-OS 33 01 108; DE-OS 35 11 661.

Primary Examiner—Eugene R. Laroche
Assistant Examiner—Son Dinh
Attorney, Agent, or Firm—Herbert L. Lerner; Laurence A. Greenberg

[57] ABSTRACT

A method and apparatus for operating at least one gas discharge lamp includes supplying a gas discharge lamp with high-frequency alternating voltage from an externally controlled lamp generator having an operating frequency being variable for dimming the gas discharge lamp. The state of the gas discharge lamp is monitored. A preheating phase with an ensuing starting phase are provided for firing the gas discharge lamp. The operating frequency of the lamp generator during the preheating phase is adjusted to be greater than a rated frequency in rated operation. The operating frequency at the beginning of the starting phase is reduced until the gas discharge lamp has attained a predetermined state and the operating frequency is subsequently maintained at least at an instantaneous value thereof until the gas discharge lamp fires. The operating frequency at the end of the starting phase is reduced to the rated frequency, thereby initiating rated operation. The operating frequency is varied for dimming in an ensuing dimming operation.

8 Claims, 5 Drawing Sheets

`5,049,790`

METHOD AND APPARATUS FOR OPERATING AT LEAST ONE GAS DISCHARGE LAMP

The invention relates to a method for operating at least one gas discharge lamp and to an apparatus for performing the method.

A method for operating a low-voltage halogen lamp is described, for example, in the publication Siemens Components 22, 1984, No. 6, pages 249–254. That publication discloses a 100 kHz switching power pack as an externally controlled lamp generator for supplying the low-voltage halogen lamp. The brightness of the halogen lamp can be varied by varying the operating frequency of the switching power pack. However, with that known circuit configuration, it is not possible to operate gas discharge lamps and in particular fluorescent tubes. In order to provide reliable and complete firing, such gas discharge lamps must in fact be preheated and then fired with a briefly high voltage. Such control is not possible with the known circuit configuration.

Furthermore, lamp generators are also known which provide self-oscillating half bridge circuits with bipolar transistors, by means of feedback. Such self-oscillating lamp generators are described, for instance, in German Published, Non-prosecuted Application DE-OS 33 01 108 or German Published, Non-prosecuted Application DE-OS 35 11 661. However, fluorescent tubes cannot be precisely preheated with such self-oscillating lamp generators, so that low-voltage discharge occurs. Although a freely oscillating lamp generator is economical, a problem which occurs especially in mass production is the deviation in electrical properties (such as gain or persistence) of the bipolar transistors. The temperature-dependent saturation behavior of the current converter transformer used in freely oscillating lamp generators causes temperature drift as well, which must be compensated for at additional expense. Furthermore, in freely oscillating lamp generators, the fluorescent tube can only be dimmed by varying the input voltage. Such variation of the input voltage is difficult to achieve because of the power supply system rectification and the required consumption of sinosoidal current from the power supply system.

It is accordingly an object of the invention to provide a method and apparatus for operating at least one gas discharge lamp, in particular a fluorescent tube, which overcome the hereinafore-mentioned disadvantages of the heretofore-known methods and devices of this general type and which permit preheating in a manner that does not harm the lamp, along with reliable firing, high efficiency in controlled rated operation, and control of the power of the gas discharge lamp.

With the foregoing and other objects in view there is provided, in accordance with the invention, a method for operating at least one gas discharge lamp, which comprises supplying a gas discharge lamp with high-frequency alternating voltage from an externally controlled lamp generator having an operating frequency being variable for dimming the gas discharge lamp; monitoring the state of the gas discharge lamp; providing a preheating phase with an ensuing starting phase for firing the gas discharge lamp; adjusting the operating frequency of the lamp generator during the preheating phase to be greater than a rated frequency in rated operation; reducing the operating frequency at the beginning of the starting phase until the gas discharge lamp has attained a predetermined state, and subsequently maintaining the operating frequency at least at an instantaneous value thereof until the gas discharge lamp fires; reducing the operating frequency at the end of the starting phase to the rated frequency, and thereby initiating rated operation; and varying the operating frequency for dimming in an ensuing dimming operation.

In accordance with another mode of the invention, there is provided a method which comprises monitoring at least one of the lamp current and/or the lamp voltage of the gas discharge lamp.

In accordance with a further mode of the invention, there is provided a method which comprises increasing the operating frequency in the event of a malfunction.

In accordance with an added mode of the invention, there is provided a method which comprises blocking the externally controlled lamp generator in the event of a malfunction.

In accordance with an additional mode of the invention, there is provided a method which comprises feeding the high-frequency alternating voltage of the externally controlled lamp generator into a resonant circuit connected or wired to the gas discharge lamp, adjusting a resonant frequency of the resonant circuit to be greater than the rated frequency when the gas discharge lamp is not fired, adjusting the resonant frequency to be less than the rated frequency when the gas discharge lamp is fired, and adjusting the operating frequency for firing the lamp to be greater than the resonant frequency when the gas discharge lamp is not fired.

In accordance with yet another mode of the invention, there is provided a method which comprises adjusting the operating frequency in the preheating phase to be greater than the rated frequency by at least a factor of 1.5.

With the objects of the invention in view, there is also provided an apparatus for operating at least one gas discharge lamp, comprising an externally controlled lamp generator including at least one power switch for periodically switching a direct voltage on and off, and a control device for triggering the at least one power switch, the control device including: a frequency generator with a variable frequency, a driver stage connected downstream of the frequency generator, a state monitoring device connected upstream of the frequency generator having means for monitoring at least the current of a gas discharge lamp and issuing output signals, a current supply device for starting up the externally controlled lamp generator and for internally supplying current to the control device, and a flow control device connected to the frequency generator and to the state monitoring device for chronologically defined variation of the frequency generator on the basis of the output signals of the state monitoring device.

In accordance with yet a further feature of the invention, the control device has means for generating a set point for an output frequency of the frequency generator, the frequency generator being adjustable as a function of the set point.

In accordance with yet an added feature of the invention, the state monitoring device also has means for monitoring the voltage of the gas discharge lamp.

In accordance with a concomitant feature of the invention, the control device is constructed in integrated fashion.

Other features which are considered as characteristic for the invention are set forth in the appended claims.

Although the invention is illustrated and described herein as embodied in a method and apparatus for operating at least one method and apparatus for operating at least one gas discharge lamp, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
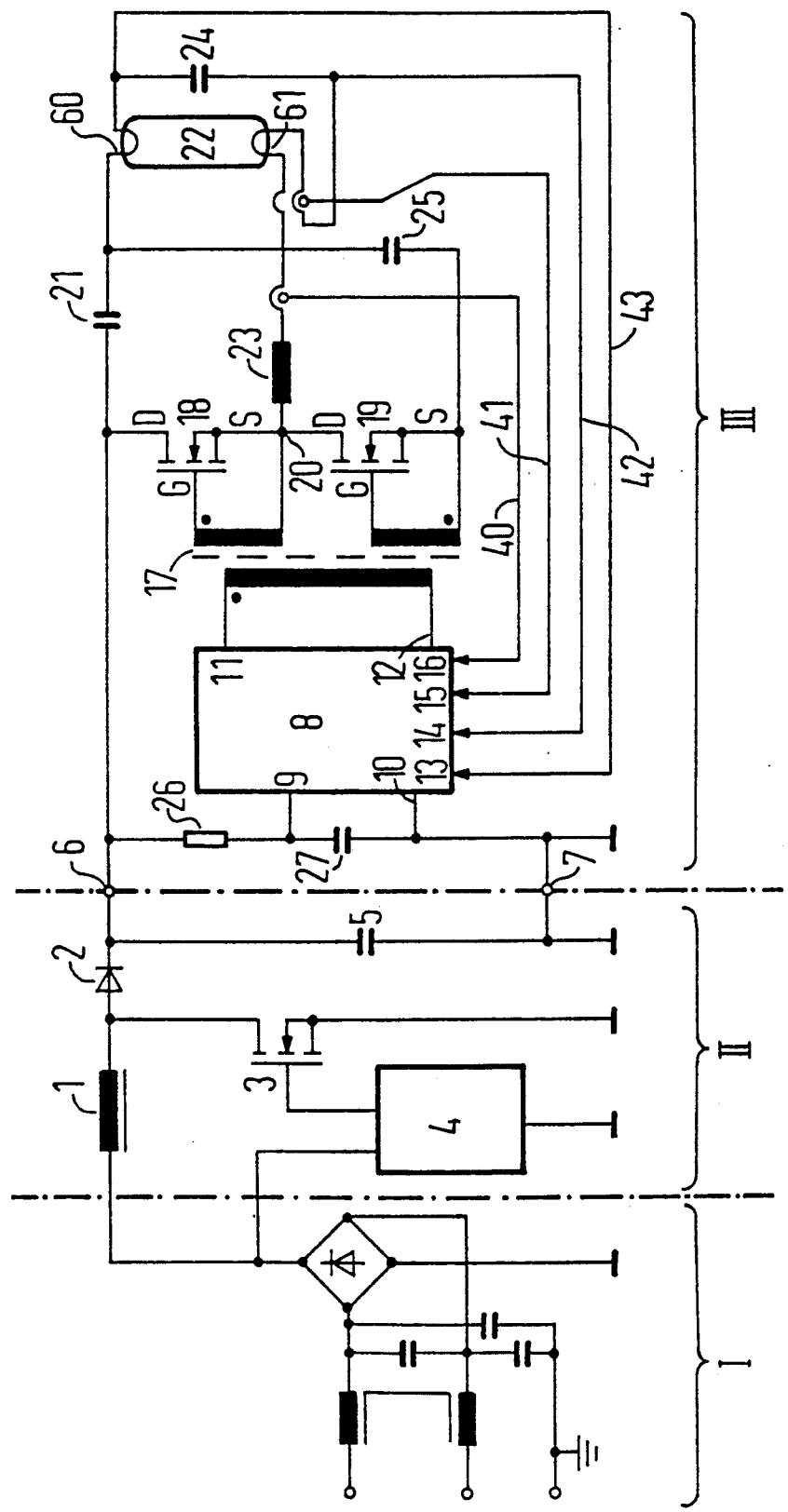
FIG. 1 is a schematic and block circuit diagram of an embodiment of an electronic fluorescent lamp ballast with an externally controlled lamp generator in a half bridge circuit, for carrying out the method according to the invention.

Referring now to the figures of the drawings in detail and first, particularly, to FIG. 1 thereof, there is seen a complete electronic fluorescent tube ballast, which is formed of a high-frequency (or HF) filter I with rectification, a harmonic filter II and an externally controlled lamp generator III. The harmonic filter II is formed of a familiar high-set adjuster, which has a charging choke 1, a recovery diode 2, a switching transistor 3 triggerable by a control unit 4, and a charging capacitor 5. A Siemens TDA 4814 integrated circuit can be used as the control unit 4, for instance. The harmonic filter II has first and second output or connecting terminals 6, 7, between which a rectified voltage is applied. The second output or connecting terminal 7 is applied to ground potential. The externally controlled lamp generator III is connected to the output or connecting terminals 6 and 7. The externally controlled lamp generator III has a control device 8 with output terminals 11, 12 to which the primary winding of a transformer 17 may be connected. The secondary side of the transformer 17 has two secondary windings, each of which is connected to the controlled system of a respective first or second electric switch element or power switch 18, 19. The two electric switch elements 18, 19, which are preferably those commonly known as "SIPMOS" ® transistors because of their favorable electrical properties, are connected to a half bridge. If such SIPMOS ® transistors are used, then the drain terminal D of the SIPMOS ® transistor forming the first electrical switch element 18 is connected to the first output or connecting terminal 6. The source terminal S of the SIPMOS ® transistor forming the first electrical switch element as well as the drain terminal D of the SIPMOS ® transistor forming the second electrical switch element 19, are connected to a connection point 20. The gate terminals G and source terminals S of these transistors are connected to the secondary windings of the transformer 17 in the above-described manner. The first output or connecting terminal 6 of the harmonic filter II is also connected through a first capacitor 21 to a first connection terminal 60 of a gas discharge lamp 22, preferably a fluorescent tube. An oscillating circuit choke 23 is connected between a second connection terminal 61 of the gas discharge lamp 22 and the connecting point 20 of the half bridge. A second capacitor 24 is connected in parallel with the gas discharge lamp 22. The first connection terminal 60 of the gas discharge lamp 22 is moreover connected through a third capacitor 25 to the source terminal S of the SIPMOS ® transistor forming the second electrical switch element 19. The externally controlled lamp generator III additionally has means for detecting at least the current through the gas discharge lamp 22. In this exemplary embodiment, provision is made for feeding in a variable for the lamp current, lamp voltage and oscillating circuit current through connecting lines 40, 41, 42, 43 to input terminals 13, 14, 15 and 16 of the control device 8. The lamp current is measured with a differential current convertor.

For self-starting, the supply of current to the control device 8 is advantageously provided through a high-resistance resistor 26, which is connected between the first output or connecting terminal 6 and an input terminal 9 of the control device 8. The continuous supply of current to the control device 8 after self-starting can be carried out in a known manner, which is not shown in this case for the sake of simplicity. This is performed by the power portion of the externally controlled lamp generator III from an auxiliary winding on the oscillating circuit choke 23 or from a charge pump that picks up current at the connection point 20 of the half bridge by means of a capacitor. An input terminal 10 of the control device 8 is connected to reference potential. A fourth capacitor 27 is connected between the input terminals 9 and 10 of the control device 8.

Figure 2:
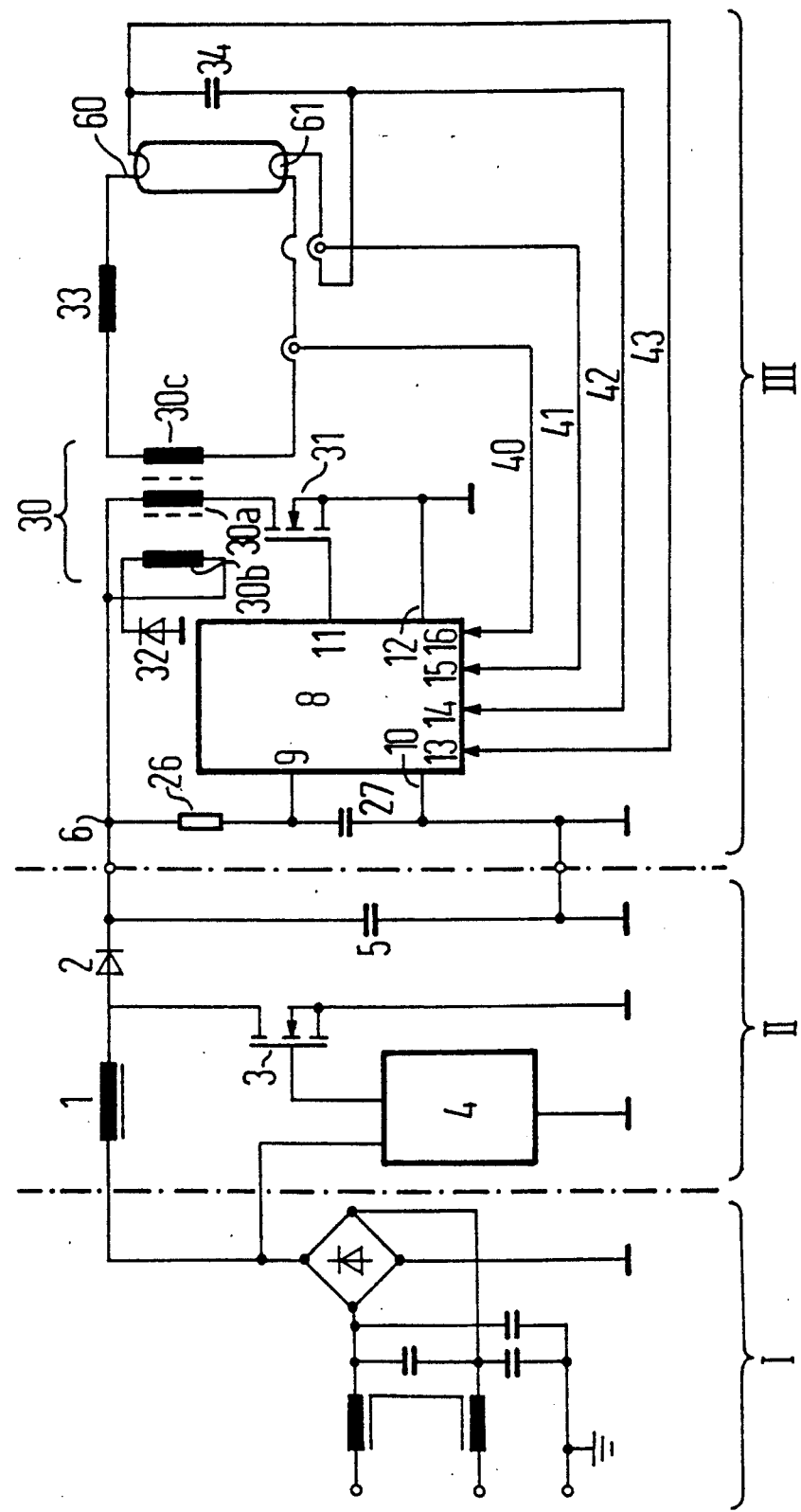
FIG. 2 is a circuit similar to that shown in FIG. 1, with an externally controlled lamp generator having a single-phase converter.

The circuit configuration shown in FIG. 2 differs from that shown in FIG. 1 only due to the fact that the externally controlled lamp generator III has a single-phase converter with a transformer 30 and a single electrical switch element 31. The reference numerals used in FIG. 1 are also used in the circuit configuration of FIG. 2 for elements which function the same. In this case, the controlled system of the electrical switch element 31 is connected to the output terminals 11 and 12 of the control device 8. A primary winding 30a of the transformer 30 is connected between the first output or connecting terminal 6 and the output of the electrical switch element 31. A first secondary winding 30b of the transformer 30 is connected between the first output or connecting terminal 6 and a diode 32 having an anode which is connected to reference potential. A series oscillating circuit which is formed of an oscillating circuit choke 33 and a capacitor 34 is connected in parallel with a second secondary winding 30c of the transformer 30. The connecting terminals 60 and 61 of the gas discharge lamp 22, which is preferably a fluorescent tube, are connected in parallel with the capacitor 34. The circuit configuration of FIG. 2 also has means for detecting at least the oscillating circuit current, and preferably the lamp current and lamp voltage as well. Measurements which are made are carried through the connecting lines 40, 41, 42 and 43 to the input terminals 13, 14, 15 and 16 of the control device 8. Once again, the lamp current is measured with a differential current converter. The supply of current to the lamp generator is effected in the manner already described in connection with FIG. 1.

Figure 3:
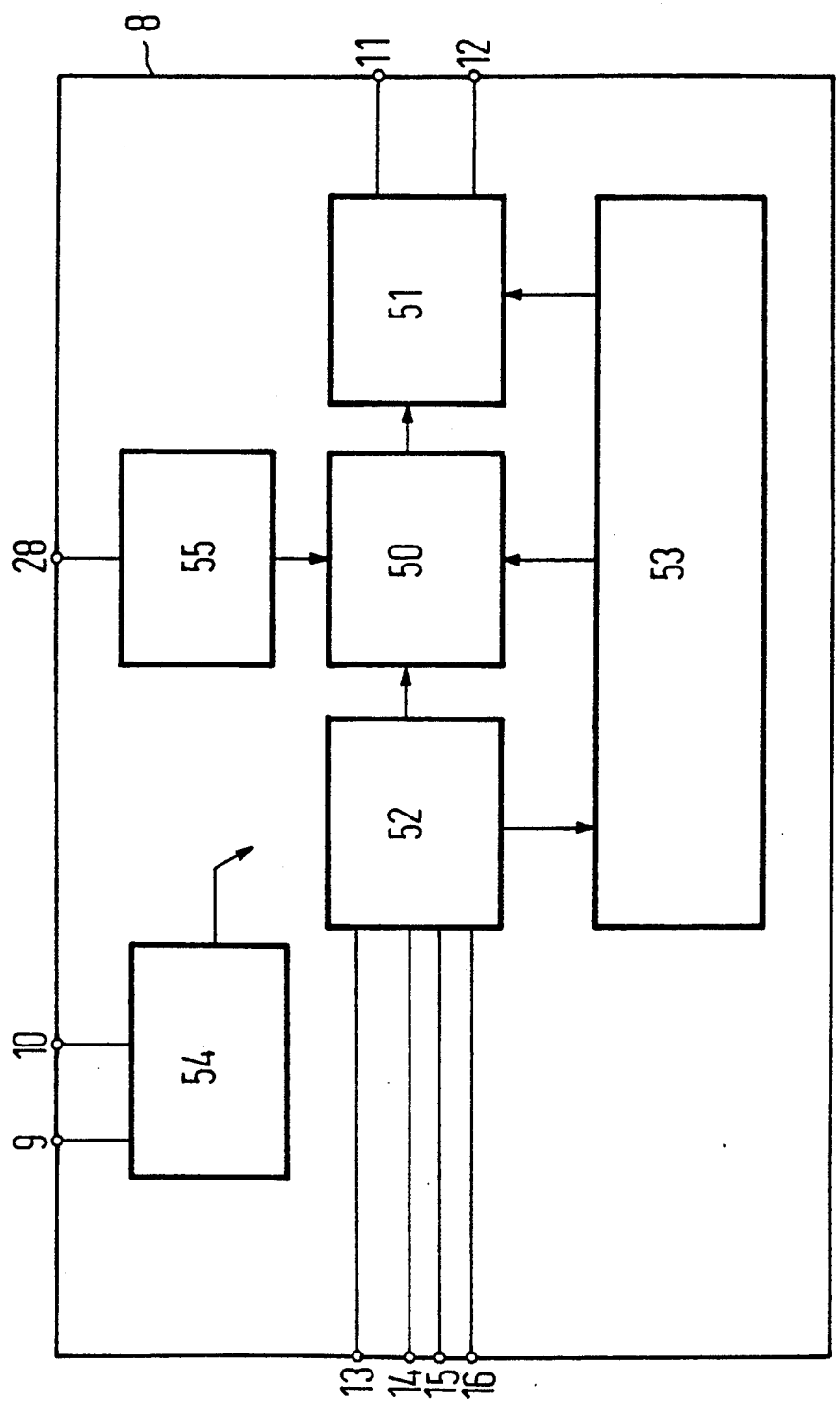
FIG. 3 is a block circuit diagram of a control device of the externally controlled lamp generator of FIGS. 1 and 2.

FIG. 3 is a block circuit diagram of the control device 8. The control device 8 has a frequency generator 50 with a variable frequency, a driver stage 51 connected downstream thereof, and a state monitoring device 52 for monitoring at least the current of the gas discharge lamp 22. For this purpose, the state monitoring device 52 is connected to the above-described connection terminals 13, 14, 15 and 16. The control unit 8 furthermore includes a flow control device 53, which is connected to the state monitoring device 52, the frequency generator 50 and the driver stage 51. Provision is also made through a connecting terminal 28 for supplying a predetermined signal to a set point specifying device 55. From this signal, the set point specifying device 55 generates a set point for the output frequency of the frequency generator 50, which is adjustable as a function of the set point. The control device 8 furthermore has a current supply device 54, which is connected to the input terminals 9 and 10 that were already described. The current supply device 54 contains a startup circuit for starting up the externally controlled lamp generator III which was described in the description of FIGS. 1 and 2 and for the internal supply of current to the control device 8. The connecting lines connecting the current supply devices 54 to the various components of the control unit 8 are not shown in FIG. 3 for the sake of simplicity. The startup circuit contained in the current supply device 54 effects the charging of a capacitor externally connected to the control unit 8, and after an upper threshold voltage is attained, self-starting with an ensuing self-powering by the power portion of the externally controlled lamp generator III can occur before a lower threshold voltage with a new self-starting state is attained.

A bipolar transistor or MOS transistor can, for instance, be triggered directly, or one or more switching transistors can be triggered through a transformer in a potential-free manner, through the output of the driver stage 51, which is connected to the output terminals 11 and 12. The output of the driver stage 51 can be blocked and/or the frequency of the frequency generator 50 can be varied upward in the event of a malfunction by means of the state monitoring device 52, in cooperation with the flow control device 53. If the malfunction persists, this state is maintained until such time as a suitable reset signal cancels the aforementioned blockage or lowers the operating frequencies $f_B$ of the frequency generator 50.

Figure 4:
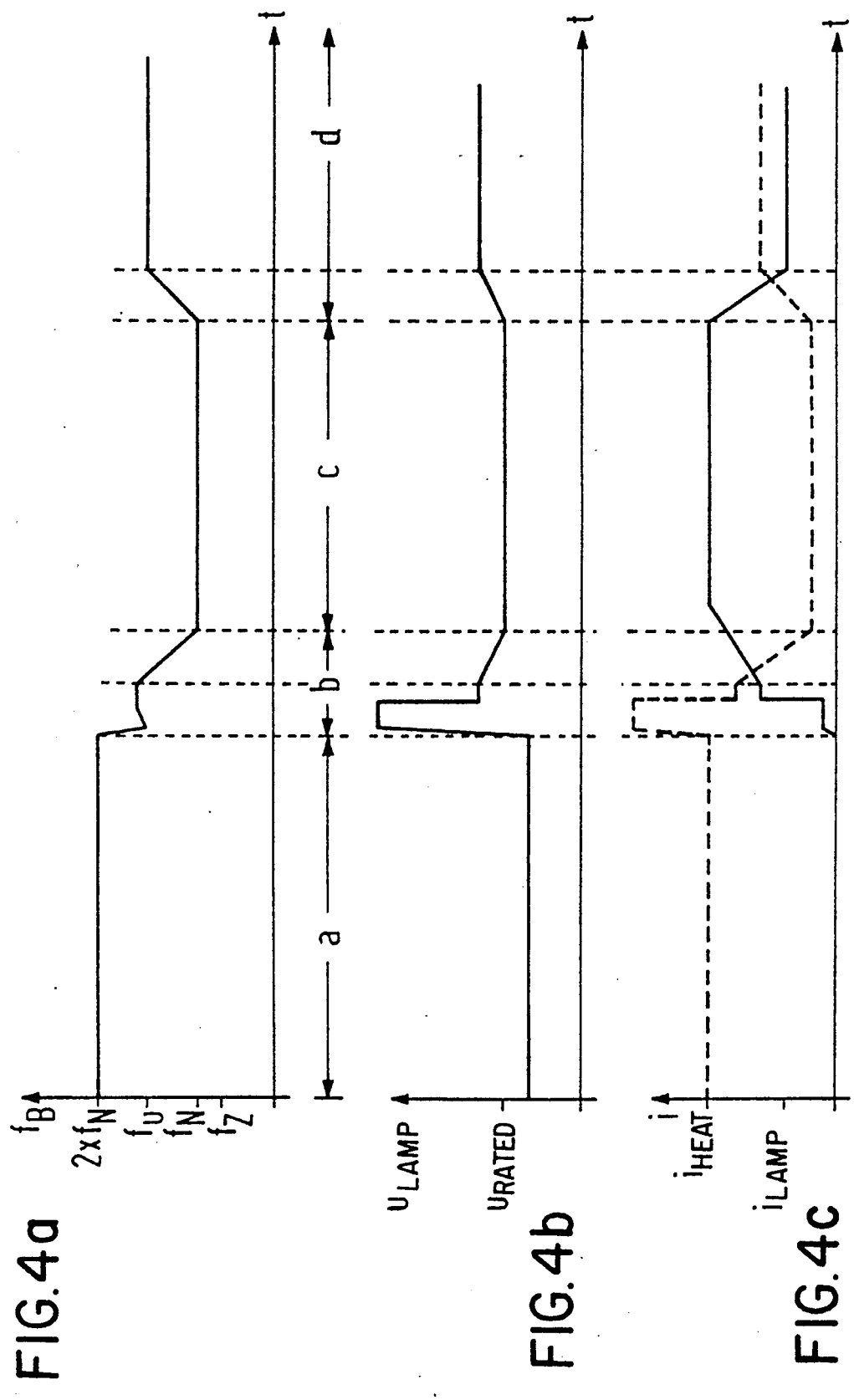
FIGS. 4a, 4b and 4c are diagrams of the course of the lamp generator operating frequency $f_B$, the lamp voltage $u_L$ and the lamp current $i_L$ plotted against time.

The method for operating a gas discharge lamp 22, in particular a fluorescent tube according to the invention, can be described as follows, referring to the course of the operating frequency $f_B$ with a readily fired gas discharge lamp 22, which is shown in FIG. 4a: During a preheating phase a, the operating frequency $f_B$ of the lamp generator is selected to be greater, preferably by at least the factor 1.5, than the rated frequency $f_N$ in rated operation, or in other words at 100% load. At the beginning of a starting phase b, which succeeds the preheating phase a, the operating frequency $f_B$ is lowered until such time as the gas discharge lamp 22 has attained a specified state. This specified state is ascertained by monitoring the lamp state, which is indicated, for instance, by the lamp current and/or the lamp voltage. Upon attaining the specified state, the operating frequency $f_B$ is maintained at least at its instantaneous value, until such time as the gas discharge lamp 22 fires.

At the end of the starting phase b, the operating frequency $f_B$ is reduced to the rated frequency $f_N$, which initiates a rated operation c of the gas discharge lamp. In ensuing normal or dimming operations d, the operating frequencies $f_B$ can be varied for dimming and thus for adjusting the brightness of the gas discharge lamp. A provision is also made for initiating a safety mode of the externally controlled lamp generator in the event of a malfunction, such as a defect in the discharge path of the gas discharge lamp 22, a deviation from normal operation, or the like. This safety mode may be in the form of increasing the operating frequency $f_B$ and/or blocking the externally controlled lamp generator.

According to a preferred further feature of the invention, a provision is made for the high-frequency alternating voltage of the externally controlled lamp generator to be fed into a resonant circuit connected to the gas discharge lamp 22. The resonant frequency $f_U$ of the resonant circuit can be selected to be higher than the rated frequency $f_N$ when the gas discharge lamp is not fired, but the resonant frequency $f_Z$ for the fired gas discharge lamp is selected to be lower than the rated frequency $f_N$, and the operating frequency $f_B$ in the preheating phase a is set to be greater than the resonant frequency $f_U$ when the gas discharge lamp is not fired.

In FIG. 4b, the voltage course $u_L$ of the gas discharge lamp is shown as it develops when the operating frequency $f_B$ is adjusted by the method according to the invention. The reference symbol $u_L$ Rated designates the voltage applied to the gas discharge lamp 22 in rated operation, or in other words at full load. It is clearly apparent in FIG. 4b that with the drop in the operating frequency $f_B$ at the beginning of the starting phase b, the lamp voltage $u_L$ increases, and the firing of the gas discharge lamp 22 begins. In FIG. 4c, the current course $i_L$ of the gas discharge lamp associated with FIGS. 4a and 4b is shown, along with the current course of the resonant circuit $i_{Heat}$.

An exemplary embodiment of a circuit configuration for the control device 8 which is described above is shown in detail in FIG. 5. The same reference numerals are used in FIG. 5 for the switch elements already described above. The frequency generator 50 has a first voltage controlled oscillator 100, having a first input terminal 101 which is connected through a capacitor 103 to ground potential. A second input terminal 102 of the first voltage controlled oscillator 100 is also connected to ground potential through a resistor 104. The input terminal 102 is also connected to a resistor 105, which in turn is connected to ground through a further capacitor 106. A connecting point between the resistor 105 and the capacitor 106 is connected to an input terminal 107 of the control device 8. The input terminal 107 is connected to a current sink 112. An output terminal 108 of the voltage controlled oscillator 100 is connected to a clock input of a flipflop 109. The inverting output $\overline{Q}$ of the flipflop 109 is connected to an input terminal 115 of an AND gate 110 of the driver stage 51. The non-inverting output Q of the flipflop 109 is connected to an input terminal 118 of a further AND gate 111 of the driver stage 51. The input terminal 10 of the control device 8 shown at the right side of the drawing is connected through a terminal x and a resistor 125 to further input terminals 116 and 119 of the AND gates 110 and 111. The input terminals 116 and 119 are also connected to the anode of a thyristor 126. The cathode connection of the thyristor 126 is connected to ground potential. The AND gates 110 and 111 each have a further input 117 and 120, which are connected to the non-inverting output Q of an RS flipflop 114. The $\overline{S}$ input of the RS flipflop 114 is connected to the output terminal 108 of the voltage controlled oscillator 100. The $\overline{R}$ input of the RS flipflop 114 is connected through an inverter element 113 to the current sink 112. The control connections of complementary emitter followers, which are formed of respective transistors 121 and 122, as well as 123 and 124 and are provided with recovery diodes, are each connected to the output terminals of the AND gates 110 and 111.

The complementary emitter follower formed of the transistors 121 and 122 includes an npn transistor 121 and a pnp transistor 122, the base connections of which are connected to the output terminal of the AND gate 110. The emitter connections of the transistors 121 and 122 are connected in common to the output terminal 111, while the collector connection of the npn transistor 121 is connected to the input terminal 10, and the collector connection of the pnp transistor 122 is connected to the input terminal 9 shown at the right side of the drawing or in other words to ground. The second complementary emitter follower formed of the transistors 123 and 124, is correspondingly connected to the AND gate 111.

The complementary emitter followers operate in push-pull fashion and enable both the direct triggering of power transistors through the output terminals 11 and 12 and the electrically separate triggering of MOS transistors through a transformer, without additional active driver components. The discharge of the MOS transistor input capacitance in the power MOS transistors with electrically separate triggering, is effected by active short-circuiting of the primary winding during the gap between pulses. Triggering of bipolar transistors with the driver stage 51 is also possible in principle.

The control device 8 also has a first comparator 127 and a second comparator 128 formed of first and second differential amplifiers. The inverting input of the first comparator 127 is connected to the input terminal 13, and the non-inverting input of the second comparator 128 is connected to the input terminal 14. The non-inverting input of the first comparator 127 and the inverting input of the second comparator 128 are connected to an output terminal of the current supply device 54, which furnishes a reference voltage $U_{ref}$ for the control device 8. The current supply device 54 also has a further output, at which a voltage $U_V$ necessary for supplying the control device 8 is supplied. The current supply device 54 is connected to the above-mentioned terminals 9 and 10 of the control device 8. The terminal 9 is connected to ground.

The output terminal of the first comparator 127 described above is connected to the $\overline{R}$ input of the RS flipflop 114. The second comparator 128 of the flow control device 53 and the state monitoring device 52 has an output connected through an inverter 129 to an input terminal 131 of a second voltage controlled oscillator 130. The output frequency of the second voltage controlled oscillator 130 is definable by a capacitor 135 that is connectable to an input terminal 134.

The output of the second voltage controlled oscillator 130 is connected to a first delay stage 136, which in turn is connected to a second delay stage 137. The second voltage controlled oscillator 130 is furthermore connected to the current supply device 54. A further output of the first delay stage 136 is connected to one input of an OR gate 140 and to one input of a further AND gate 138. The output of the second delay stage 137 is connected to a further input of the AND gate 138. The signal present at the output of the second comparator 128 is fed through an inverting element 139 to a further input of the AND gate 138. The output of the AND gate 138 is connected with the gate electrode of the thyristor 126. The signal present at the differential amplifier forming the second comparator 128 is also fed to a further input of the OR gate 140 through a further connecting line. The inverting output of the OR gate 140 is connected to the base connection of an npn transistor 141. The emitter connection of the npn transistor 141 is connected to ground potential, while the collector connection thereof is connected to the above-mentioned connection terminal 107. The collector connection of the transistor 141 is also connected to the anode of a diode 154, having the cathode connection thereof connected to the output of a third differential amplifier 153. The inverting input of the third differential amplifier 153 is connected to a connection terminal 159 of the control device 8, at which the current measured at the gas discharge lamp is fed in through a resistor 157. Both a capacitor 156 and a resistor 155 are connected in parallel between the cathode connection of the diode 154 and the terminal 159. A resistor 151 is connected between a further terminal 158 and the non-inverting input of the differential amplifier 153. The non-inverting input of the differential amplifier 153 is also connected to the cathode connection of a further diode 150, having the anode connection thereof connected to the output of the inverter 129.

Figure 5:
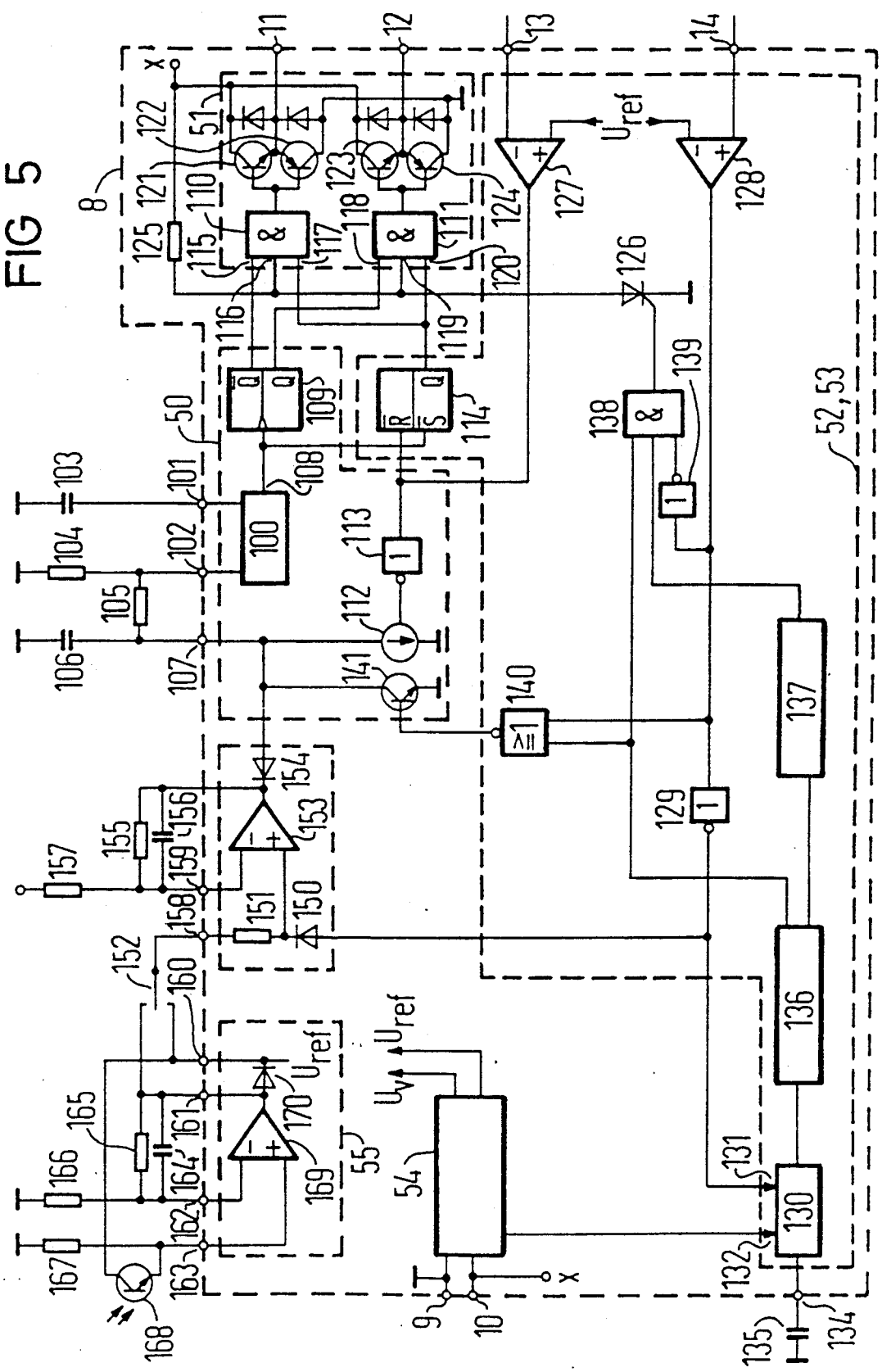
FIG. 5 is a circuit diagram of the control device of FIG. 3.

A set point can be specified to the input terminal 158 through a switching device 152. The set point is derived from a reference voltage source at a constant lamp output, or from set point preparing means with a variable lamp output. The set point preparing means may, for instance, be formed of an adaptation amplifier with low-pass behavior, by means of which, for instance, an analog control signal from a brightness sensor, or a signal encoded by pulse width modulation, can be adapted to the lamp current control through an optical coupler. As shown in FIG. 5, the adaptation amplifier with low-pass behavior may, for instance, be formed by connecting the inverting input of a differential amplifier 169 to a connection terminal 162 that is connected to ground potential through a resistor 166. The non-inverting input of the differential amplifier 169 is connected to an input terminal 163, which is also connected to ground through a resistor 167. The output of the differential amplifier 169 is connected to the anode of a diode 170 and to a connection terminal 161. The cathode connection of the diode 170 is connected to the voltage $U_{ref}$ of the current supply device 54. A parallel circuit formed of a capacitor 164 and a resistor 165 is connected between the connection terminal 161 and the connection terminal 162. Through the use of the switching device 152, the input terminal 158 can be selectively switched to a terminal 160, at which the reference voltage $U_{ref}$ is applied, or to the input terminal 161. A photoelectric element, such as a photoelectric transistor 168, is connected with the load segment thereof between the input terminals 163 and 160. The circuit configuration shown in this case can also be made as an integrated circuit.

The mode of operation of this circuit configuration is as follows: The capacitor 27 connected between the input terminals 9 and 10 of the control device 8 is charged to the rectified voltage of the power system through the resistor 26. A standby function of the current supply device 54 prevents consumption of current by the control device 8 and monitors the charge process, while consuming little current itself. As soon as an upper threshold voltage is attained, the current supply device 54 releases the current for the control device 8. The necessary energy is drawn from the capacitor 27, as long as independent supply through the power portion of the externally controlled lamp generator III is possible, or the capacitor voltage reaches a lower threshold voltage and standby operation begins again.

As soon as the current supply device 54 of the control device 8 is liberated, the power transistors are triggered through the driver stage 51 by the frequency generator 50. The frequency generator 50 begins at the particular operating frequency $f_B$ that is intended for the preheating phase of the fluorescent tube and is determined by the capacitor 103 and the resistors 104 and 105. The resistors 104 and 105 act upon the current mirror 112 to charge the capacitor 103. If the capacitor 106 is discharged or short-circuited, the parallel circuit of the resistors 105 and 104 acts. In this operating phase, the state monitoring device 52 detects the fact that the lamp current fed in at the input terminal 14 is virtually or completely equal to zero, and initiates the activation for malfunction situations. In this process the capacitor 106 is short-circuited, which adjusts the operating frequencies $f_B$ in accordance with invention. The lamp current control means is blocked, and a first delay stage is activated. During this first delay period, of 0.3 to 0.5 seconds, for example, the gas discharge lamp is preheated.

If the gas discharge lamp should fire prior to the end of the preheating phase, which may, for instance, be the case if the lamp is already warm, then the state monitoring device 52 recognizes normal operation from the lamp current then flowing, shuts off the flow control, and enables the lamp current control.

In general, after the end of the operation of the first delay stage 136, the firing process is initiated and the second delay stage 137 is activated. In the firing phase b the short circuiting of the capacitor 106 is cancelled, which causes the slow charging of the capacitor 103 through the resistor 105, and the operating frequency $f_B$ drops. If the gas discharge lamp is not firing, the lowest operating frequency is determined by the resistor 104, which is preferably lower than the resonant frequencies $f_U$ of the unloaded lamp oscillating circuit. However, the lowest operating frequency $f_B$ is not attained during the firing phase in any case, because the current limiting means comes into play to protect the transistors in the vicinity of the resonant frequency. As soon as a given threshold is exceeded, the current limiting means function by immediately blocking the transistors (shortening the ON time) and by gradually raising the operating frequencies $f_B$ by discharging the capacitor 106 through a current sink. Upon firing of the gas discharge lamp, the state monitoring device 52 recognizes normal operation, shuts off the startup control and enables the lamp current control. Advantageously, operation with dimmed lamp power is thus possible immediately after reliable firing of the gas discharge lamp. If the gas discharge lamp does not fire within the delay period of the second delay stage 137, which is, for instance, one to two seconds, then the driver stage 51 is blocked and re-starting is prevented. This continues until the current drops below the holding current of the thyristor 126, which is the result of a reset signal that is not described in detail herein, or as a result of a power outage. If a defect in the lamp occurs after a period of normal operation, then the state monitoring device functions in the same manner as described above for the starting operation.

The foregoing is a description corresponding in substance to European Application 88 115 709.3, dated Sept. 23, 1988, the International priority of which is being claimed for the instant application, and which is hereby made part of this application. Any material discrepancies between the foregoing specification and the aforementioned corresponding European application are to be resolved in favor of the latter.

We claim:

1. Method for operating at least one gas discharge lamp in various states, which comprises supplying a gas discharge lamp with high-frequency alternating voltage from an externally controlled lamp generator having an operating frequency being variable for dimming the gas discharge lamp; monitoring the state of the gas discharge lamp; providing a preheating phase with an ensuing starting phase for firing the gas discharge lamp; adjusting the operating frequency of the lamp generator during the preheating phase to be greater than a rated frequency in rated operation; reducing the operating frequency at the beginning of the starting phase until the gas discharge lamp has attained a predetermined state, and subsequently maintaining the operating frequency at least at an instantaneous value thereof until the gas discharge lamp fires; reducing the operating frequency at the end of the starting phase to the rated frequency, and thereby initiating rated operation; and varying the operating frequency for dimming in an ensuing dimming operation.

2. Method according to claim 1, which comprises monitoring at least one of the lamp current and the lamp voltage of the gas discharge lamp.

3. Method according to claim 1, which comprises increasing the operating frequency in the event of a malfunction of a gas discharge lamp.

4. Method according to claim 1, which comprises blocking the externally controlled lamp generator in the event of a malfunction of a gas discharge lamp.

5. Method according to claim 1, which comprises feeding the high-frequency alternating voltage of the externally controlled lamp generator into a resonant circuit connected to the gas discharge lamp, adjusting a resonant frequency of the resonant circuit to be greater than the rated frequency when the gas discharge lamp is not fired, adjusting the resonant frequency to be less than the rated frequency when the gas discharge lamp is fired, and adjusting the operating frequency for firing the lamp to be greater than the resonant frequency when the gas discharge lamp is not fired.

6. Apparatus for operating at least one gas discharge lamp, comprising:
    an externally controlled lamp generator including at least one power switch for periodically switching a direct voltage on and off, and a control device for triggering said at least one power switch,
    said control device including:
    a frequency generator with a variable frequency, a driver stage connected downstream of said frequency generator,
    a state monitoring device connected upstream of said frequency generator having means for monitoring at least the current of a gas discharge lamp and means for monitoring the voltage of the gas discharge lamp and issuing output signals, a current supply device for starting up said externally controlled lamp generator and for internally supplying current to said control device, and a flow control device connected to said frequency generator and to said state monitoring device for chronologically defined variation of said frequency generator on the basis of said output signals of said state monitoring device.

7. Apparatus according to claim 6, wherein said control device has means for generating a set point for an output frequency of said frequency generator, said frequency generator being adjustable as a function of said set point.

8. Apparatus for operating at least one gas discharge lamp, comprising:

an externally controlled lamp generator including at least one power switch for periodically switching a direct voltage on and off, and a control device for triggering said at least one power switch, said control device including:

a frequency generator with a variable frequency, a driver stage connected downstream of said frequency generator, a state monitoring device connected upstream of said frequency generator having means for monitoring at least the current of a gas discharge lamp and means for monitoring at least one of voltage of the gas discharge lamp and oscillating current, and for issuing output signals, a current supply device for starting up said externally controlled lamp generator and for internally supplying current to said control device, and a flow control device connected to said frequency generator and to said state monitoring device for chronologically defined variation of said frequency generator on the basis of said output signals of said state monitoring device.

* * * * *